United States Patent
Makishima et al.

(10) Patent No.: US 6,788,684 B2
(45) Date of Patent: *Sep. 7, 2004

(54) CELL BRIDGE APPARATUS AND CELL BRIDGING METHOD AS WELL AS INFORMATION TRANSMISSION SYSTEM HAVING CELL BRIDGE APPARATUS

(75) Inventors: Hiromichi Makishima, Yokohama (JP); Yuji Obana, Yokohama (JP); Hiroyuki Asano, Kawasaki (JP); Toshiaki Ookubo, Yokohama (JP); Hideo Abe, Yokohama (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/201,106

(22) Filed: Nov. 30, 1998

(65) Prior Publication Data

US 2003/0133453 A1 Jul. 17, 2003

(30) Foreign Application Priority Data

Jun. 19, 1998 (JP) .......................................... 10-173318

(51) Int. Cl.⁷ .......................... H04L 12/28; H04L 12/56
(52) U.S. Cl. ...................................... 370/390; 370/412
(58) Field of Search ........................ 370/351, 389–390, 370/412–421, 431–432; 710/117, 52

(56) References Cited

U.S. PATENT DOCUMENTS

| 4,964,119 | A | * | 10/1990 | Endo et al. ................. 370/237 |
| 5,577,035 | A | * | 11/1996 | Hayter et al. ................ 370/395 |
| 5,724,351 | A | * | 3/1998 | Chao et al. ............. 370/395.42 |
| 5,724,358 | A | * | 3/1998 | Headrick et al. ........... 370/418 |
| 6,128,295 | A | * | 10/2000 | Larsson et al. ............. 370/389 |
| 6,185,206 | B1 | * | 2/2001 | Nichols et al. ............. 370/390 |
| 6,188,690 | B1 | * | 2/2001 | Holden et al. .............. 370/390 |
| 6,212,182 | B1 | * | 4/2001 | McKeown ................. 370/390 |
| 6,320,864 | B1 | * | 11/2001 | Hebb et al. ................. 370/412 |

FOREIGN PATENT DOCUMENTS

| JP | 3-186036 | 8/1991 |
| JP | 7-202908 | 8/1995 |
| JP | 8-008917 | 1/1996 |
| JP | 8-037525 | 2/1996 |
| JP | 9-083522 | 3/1997 |
| JP | 9-162879 | 6/1997 |
| JP | 10-013416 | 1/1998 |
| JP | 10-041957 | 2/1998 |

* cited by examiner

Primary Examiner—Seema S. Rao
Assistant Examiner—Kevin C. Harper
(74) Attorney, Agent, or Firm—Katten Muchin Zavis Rosenman

(57) ABSTRACT

An ATM cell bridge apparatus and a cell bridging method as well as an information transmission system having a cell bridge apparatus by which a cell can be outputted in accordance with a priority degree even during multicast processing. The ATM cell bridge apparatus includes a buffer unit for storing cell data of input cells, a buffer control unit for controlling writing and reading out of the cell data into and from the buffer unit, a cell production control unit for managing multicast information of the cell data read out from the buffer unit by the buffer control unit and producing a cell to be outputted from header information of the cell data, and a cell outputting unit for outputting the cell produced by the cell production control unit and issuing a cell data readout request to the buffer control unit.

8 Claims, 17 Drawing Sheets

FIG. 13

| FIELD | EXPLANATION |
|---|---|
| GFC [3:0] | GFC bits |
| ConnID [15:8] | Connection ID MSB |
| VCI [15:12] | VCI upper nibble of MSB |
| VCI [11:0] | VCI lower nibble of MSB and LSB |
| PTI [2:0] | PTI bits |
| CLP | CLP bits |
| ConnID [7:0] | Connection ID LSB |
| Pri [2:0] | Priority of Cell |
| Imp | Importance of cell |
| Res [1:0] | Reserved |
| HP | Parity of Header |
| DP | Parity of Data |

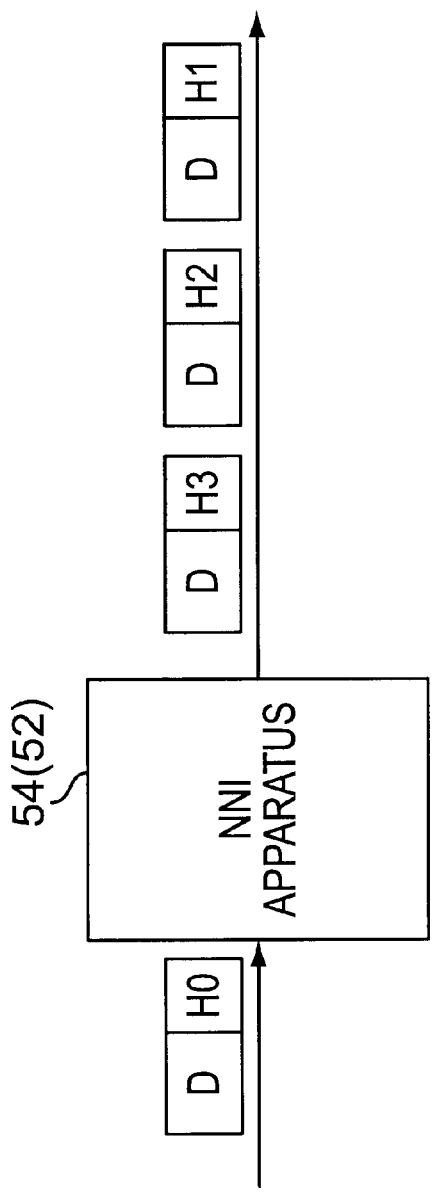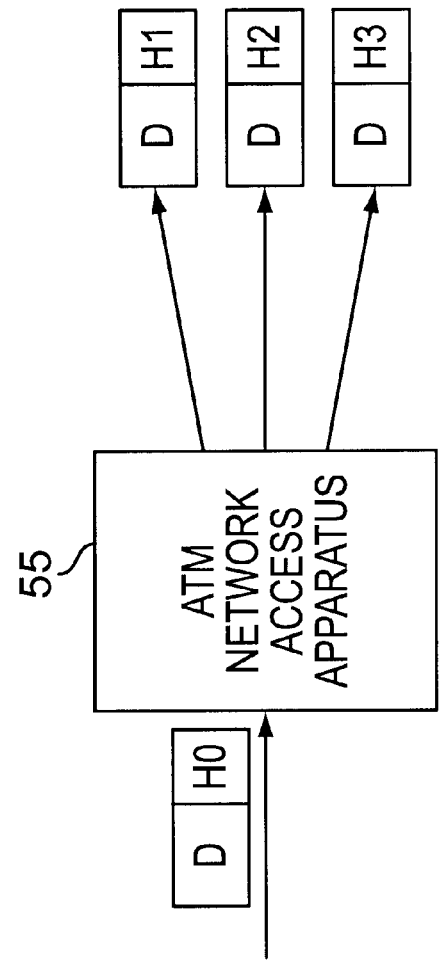
FIG. 16(a) RELATED ART
FIG. 16(b) RELATED ART

CELL BRIDGE APPARATUS AND CELL BRIDGING METHOD AS WELL AS INFORMATION TRANSMISSION SYSTEM HAVING CELL BRIDGE APPARATUS

BACKGROUND OF THE INVENTION

1) Field of the Invention

This invention relates to a cell bridge apparatus and a cell bridging method as well as an information transmission system having a cell bridge apparatus suitable for use with a multimedia transmission system for an ATM network which handles ATM cells as fixed length cells. Here, the term ATM is an abbreviation of Asynchronous Transfer Mode.

2) Description of the Related Art

In recent years, as one of services of a B-ISDN, an integrated video service such as a VOD (Video on Demand) service has been proposed. The integrated video service is provided to allow a subscriber to freely extract and utilize information such as video and audio information stored in a center. Such information is placed into ATM cells and communicated between the center and the subscriber using an ATM technique. In this instance, if a plurality of subscribers require the same information, in order to minimize the traffic on the network to reduce a burden to the center or a repeating unit which serves as a transmission source, it is demanded to deliver only one piece of information to the network and produce a number of copies of it equal to the number of requesting subscribers in each node.

FIG. 15 illustrates a concept of an integrated video service. Referring to FIG. 15, an ATM information transmission system 50 shown includes a center 51 which accepts a request from a customer and distribute video and image data of a movie and so forth, network node interface (NNI) apparatus 52 and 54 having a cell bridging function, an ATM network 53 for distributing cells to a plurality of stations, an ATM network access apparatus 55, subscriber terminals 56-1 to 56-n, and so forth.

The center 51 stores multimedia information of movies and so forth and extracts and distributes, in response to a plurality of requests for the same work from the subscriber terminals 56-i (i=1 to n), only one video data of the work to the ATM network 53, and the ATM network access apparatus 55 copies the video data cell to produce a number of copies equal to the number of requests, thereby minimizing the traffic of the ATM network 53.

The ATM network access apparatus 55 described above is required to apply, to information to be transmitted, a priority degree in accordance with contents of the information and communicate the resulting information. The function of adding a priority degree is realized by bridging, where information D is distributed in a one to multiple fashion (1: multiples), the signal by means of the NNI apparatus 54 or the ATM network access apparatus 55. FIG. 16(a) illustrates an example of bridging by the NNI apparatus 52 or 54, and FIG. 16(b) illustrates an example of bridging by the ATM network access apparatus 55. In both cases, the information D is copied to produce a required number of copies, and simultaneously, new headers H1, H2 and H3 are produced from the header H0 of the ATM cell and outputted together with the copies of the information D to bridge the information D. The bridging illustrated in FIG. 16(a) is called intra-port multicast, and the bridging illustrated in FIG. 16(b) is called multicast.

However, in the technique described above, where it is intended to bridge an ATM cell in such a manner as seen in FIG. 16(a) or 16(b), where the method of copying a cell to produce a number of copies equal to the number of cells to be outputted is employed, a large number of buffers are required, which increases the circuit scale.

Japanese Patent Laid-Open Application No. Heisei 9-83522 discloses a novel technique of an ATM switch which functions as an exchange when data communication by an ATM is performed between terminals or nodes, or more particularly, an ATM switch which is connected to a communication network such as a B-ISDN and can reduce a burden to a transmission source node involved in transmission processing, can eliminate a temporary increase of the traffic of cells in the ATM switch and can prevent an increase of the circuit scale of the ATM switch without increasing the buffer capacity of the ATM switch.

FIG. 17 illustrates operation of a cell bridge apparatus disclosed in Japanese Patent Laid-Open Application No. Heisei 9-83522 mentioned above. Referring to FIG. 17, an ATM network access apparatus 55 or an NNI apparatus 54 (52) shown produces a plurality of headers H1, H2 and H3 based on the header part H0 of a cell C0, copies the data part D1 of the cell D which represents information to produce three copies, reads out data from a buffer based on the headers, composes them to produce new cells C1, C2 and C3, and sends out the new cells C1, C2 and C3. If, in FIG. 17, another cell C4 having a higher priority degree is inputted during outputting of the cell C1 corresponding to the cell C0, then the copying processing for the plurality of headers C2 and C3 for the copies having been produced already must be continued. Consequently, a cell C5 of a higher priority degree originating from the cell C4 is outputted after sending out of the copies is completed.

Referring back to FIG. 15, a multicast method where the cell bridge apparatus shown is used for a node between a point and multiple points is described. As seen from the inside of a frame A in FIG. 15, if a cell C0 which has data D1 and another cell C4 which has data D2 for system control and has a higher priority degree are inputted successively, then after the cell C0 is copied to produce three copies and the thus copied cells C1, C2 and C3 are outputted to the subscriber terminals 56-1, 56-2 and 56-3, respectively, the cell C4 is processed and a resulting corresponding cell C5 is outputted to the subscriber terminal 56-4. In other words, the cell C4 having a higher priority degree is outputted after the multicast is completed.

Accordingly, the technique described above has a subject to be solved in that, when multicast processing is performed by a large amount, transmission of a cell of a higher priority degree is retarded by multicast cells.

SUMMARY OF THE INVENTION

It is an object of the present invention to provide a cell bridge apparatus and a cell bridging method as well as an information transmission system having a cell bridge apparatus by which a cell can be outputted in accordance with a priority degree of it even during multicast processing.

In order to attain the object described above, according to an aspect of the present invention, there is provided a cell bridge apparatus, comprising a buffer unit for storing cell data of input cells, a buffer control unit for controlling writing and reading out of the cell data into and from the buffer unit, a cell production control unit for managing multicast information of the cell data read out from the buffer unit by the buffer control unit and producing a cell to be outputted from header information of the cell data, and a cell outputting unit for outputting the cell produced by the cell production control unit and issuing a cell data readout request to the buffer control unit, the buffer unit storing the cell data in accordance with priority degrees of the input cells, the buffer control unit being constructed in such a manner as to read out, when the cell data readout request from the cell outputting unit is received, the input cell data of a high priority degree from among the cell data stored in the buffer unit.

Accordingly, the cell bridge apparatus is advantageous in that it can process a cell having a high priority degree even during multicast processing and moderates the burden to a transmission source by intra-port multicast on the ATM transmission apparatus. The cell bridge apparatus is advantageous also in that, since cells are transmitted in accordance with priority degrees thereof, the transmission efficiency of cells having high priority degrees can be raised.

The buffer unit may include a plurality of buffers provided individually for the different priority degrees of the input cells. This makes the cell bridge apparatus further advantageous in that management of the buffers in accordance with the priority degrees is facilitated.

The buffer control unit may read out, when a readout request from the cell outputting unit is received, one of the input cell data stored in the buffer unit which has the highest priority degree. This makes the cell bridge apparatus further advantageous in that a cell having a high priority degree can be processed during multicast processing and the transmission efficiency of cells having high priority degrees can be raised.

The cell production control unit may include a register for storing an updateable offset value in accordance with a priority degree of the input cell, a router memory for storing header information and multicast information for the cell to be outputted, a router memory control unit for reading out the header information and the multicast information stored in the router memory using address information which is produced based on pointer information obtained from identification information of the cell data read out from the buffer unit by the buffer control unit and the offset value read out from the register based on priority degree information of the input cell which the cell data have, a cell production unit for producing the cell to be outputted from the cell data read out from the buffer unit by the buffer control unit and the header information read out from the router memory by the router memory control unit, and an offset updating unit for updating the offset value stored in the register taking the multicast information read out from the router memory by the router memory control unit into consideration. This makes the cell bridge apparatus further advantageous in that, if an intra-port multicast cell is inputted after processing of a cell having a higher priority degree is completed, then the processing can be resumed from an interrupted portion thereof, and processing in accordance with the priority degrees can be performed.

The cell production control unit may output, when the multicast information read out from the router memory by the router memory control unit is information representing that multicast is unnecessary, a request to the buffer control unit to erase the corresponding cell data, which are being currently processed, stored in the buffer unit. This makes the cell bridge apparatus further advantages in that it can be discriminated whether the same cell data is to be processed only once or repetitively several times, and since the cell data has a different value every time due to the offset value, cells having different routing information can be outputted.

According to another aspect of the present invention, there is provided a cell bridging method for a cell bridge apparatus which includes a buffer unit for storing cell data of input cells, a buffer control unit for controlling writing and reading out of the cell data into and from the buffer unit, a cell production control unit for producing a cell to be outputted from the cell data read out from the buffer unit by the buffer control unit, and a cell outputting unit for outputting the cell produced by the cell production control unit, comprising the steps of storing the cell data of the input cells into the buffer unit in accordance with priority degrees of the input cells, reading out, when the buffer control unit receives a cell data readout request from the cell outputting unit, the input cell data of a high priority degree from among the cell data stored in the buffer unit by the buffer control unit, performing management of multicast information of the cell data read out from the buffer unit by the buffer control unit in accordance with the priority degrees of the cell data and producing a cell to be outputted from header information of the cell data by the cell production control unit, outputting the cell produced by the cell production control unit from the cell outputting unit, and issuing, after the cell is outputted from the cell outputting unit, the cell data readout request to the buffer control unit from the cell outputting unit.

Accordingly, the cell bridging method is advantageous in that, while intra-port multicast is performed, cells can be outputted in accordance with the priority degrees of the same.

The cell bridging method may further comprise a step of reading out, when the cell data readout request is received from the cell outputting unit, by the buffer control unit, the input cell data having the highest priority degree from among the cell data stored in the buffer unit. This makes the cell bridging method further advantageous in that, even during multicast processing, ATM bridging wherein cells can be outputted in accordance with the priority degrees of the same can be performed.

According to a further aspect of the present invention, there is provided an information transmission system, comprising a center unit for storing information, a plurality of terminals which utilize the information from the center unit, and a cell bridge apparatus for performing multicasting for the information transmitted over a network, which handles fixed length cells, from the center unit to transmit the information to the plurality of terminals, the cell bridge apparatus including a buffer unit for storing cell data of input cells, a buffer control unit for controlling writing and reading out of the cell data into and from the buffer unit, a cell production control unit for managing multicast information of the cell data read out from the buffer unit by the buffer control unit and producing a cell to be outputted from header information of the cell data, and a cell outputting unit for outputting the cell produced by the cell production control unit and issuing a cell data readout request to the buffer control unit, the buffer unit storing the cell data in accordance with priority degrees of the input cells, the buffer control unit being constructed in such a manner as to read out, when the cell data readout request from the cell outputting unit is received, the input cell data of a high priority degree from among the cell data stored in the buffer unit.

Accordingly, the information transmission system is advantageous in that the burden to a transmission source on the ATM network can be moderated and the transmission rate of data having high priority degrees can be raised.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 13 is a diagrammatic view illustrating different fields of an input cell according to the present invention;

FIG. 16(a) is a diagrammatic view illustrating an example of bridging by an NNI apparatus;

FIG. 16(b) is a diagrammatic view illustrating an example of bridging by a UNI apparatus.

DESCRIPTION OF THE PREFERRED EMBODIMENT

Figure 1:
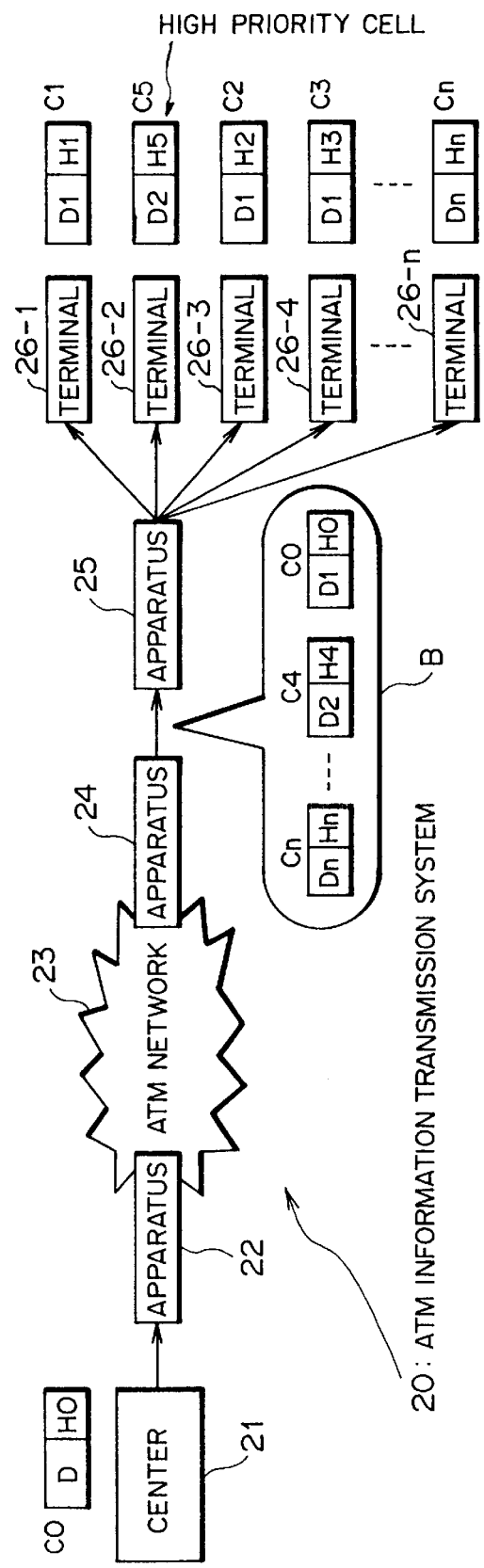
FIG. 1 is a block diagram illustrating a concept of an integrated video service to which the present invention is applied.

Referring first to FIG. 1, there is illustrated a concept of an integrated video service to which the present invention is applied. An ATM information transmission system 20 shown in FIG. 1 has a function of processing, when cell data having a higher priority degree are received during multicast copying, the cell preferentially, and includes a center 21 for receiving a request from a customer and distributing multimedia data such as a movie or music, NNI apparatus 22 and 24 serving as interfaces between nodes and between networks, an ATM network 23, a user network interface (UNI) apparatus 25, and subscriber terminals 26-1 to 26-n.

A system control signal presents data of a high priority degree, and audio data have a higher priority degree than video data.

In the ATM information transmission system 20, multimedia data outputted from the center 21 are inputted to NNI apparatus 24 through the NNI apparatus 22 and the ATM network 23. If, as seen from the inside of a frame B shown in FIG. 1, for example, a cell C0 having video data D1 and another cell C4 having data D2 for system control are inputted successively and the cell C4 arrives during processing for production of the first copy while the cell C0 is copied to produce three copies, then after the cell C1 which is the first copy of the cell C0 is outputted to the subscriber terminal 26-1, the cell C4 is processed preferentially and outputted as a cell C5 to the subscriber terminal 26-2. Thereafter, the remaining cells C2 and C3 copied from the cell C0 are outputted to the subscriber terminal 26-3 and the subscriber terminal 26-4, respectively. Thus, after the cell C4 which has a higher priority degree is processed, the processing regarding the cell C0 is resumed at the interrupted portion thereof.

In this manner, the data D are copied to produce a required number of copies and new header information H1, H2 and H3 is added to the copied data using the header H0 of the ATM cell, and resulting data are outputted, thereby bridging the data D. While a bridging function which involves a plurality of output destination ports is called multicast, another bridging function which involves a single output destination port is called intra-port multicast. However, both of the multicast and the intra-port multicast have a same function in that a cell is copied and bridged from a certain node to another node.

Figure 2:
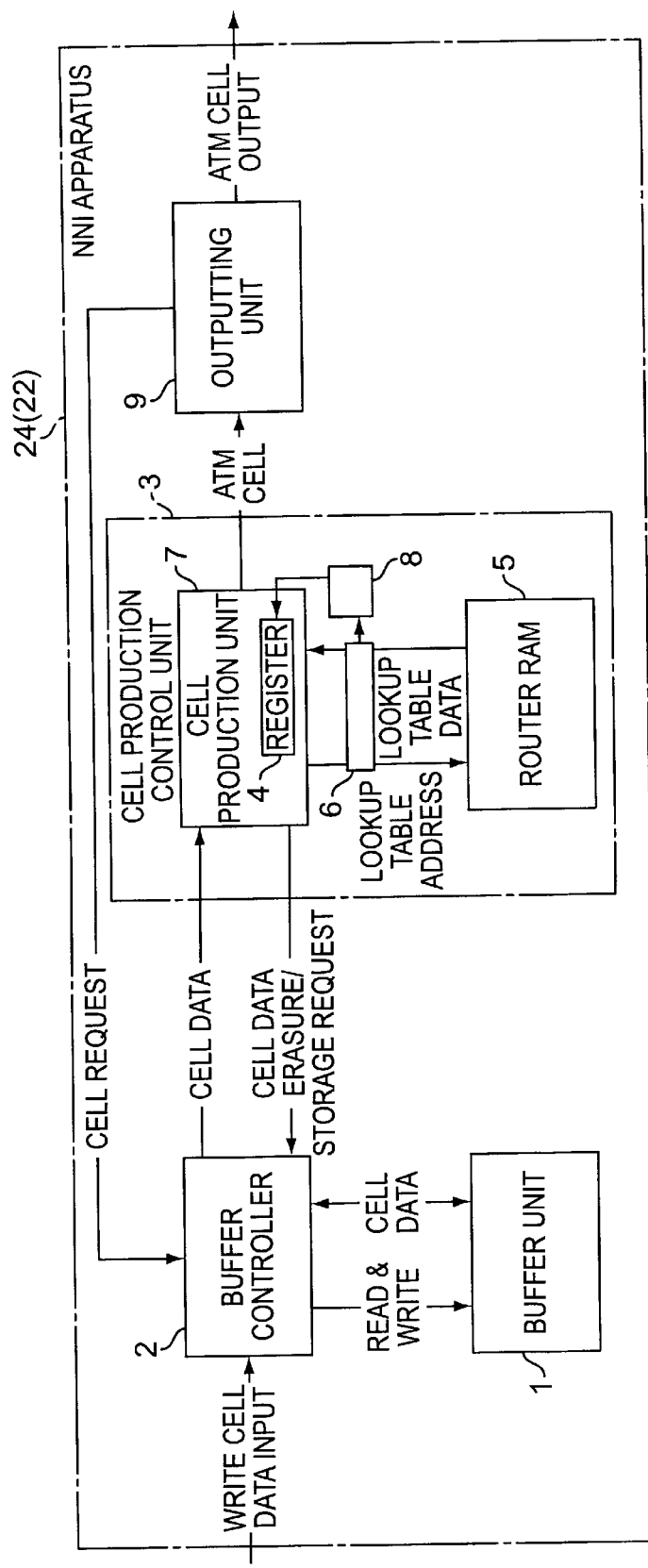
FIG. 2 is a block diagram of an NNI apparatus to which the present invention is applied.
Figure 3:
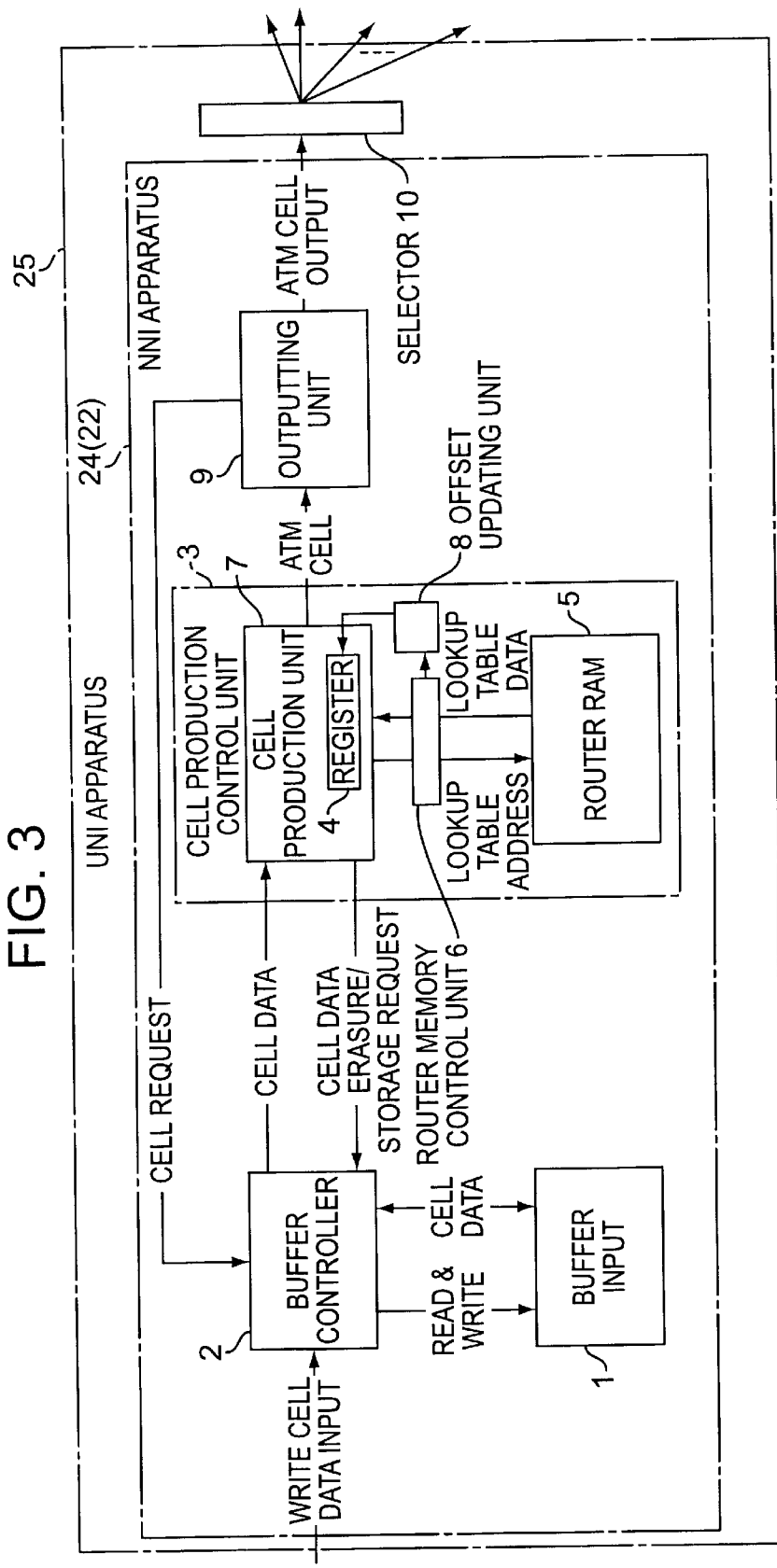
FIG. 3 is a block diagram of a UNI apparatus to which the present invention is applied.

That the multicast and the intra-port multicast have a same function can be recognized from the constructions of them. FIG. 2 shows a block diagram of the NNI apparatus 24 (22) while FIG. 3 shows a block diagram of the UNI apparatus 25 which is switchable to a plurality of output destination ports, both according to a preferred embodiment of the present invention. The NNI apparatus 24 shown in FIG. 2 is provided for the intra-port multicast wherein a single output destination port is involved while the UNI apparatus 25 shown in FIG. 3 includes such a construction of the NNI apparatus 24 as just described and a selector 10 for distributing an output of the NNI apparatus 24.

Accordingly, the two apparatus, that is, the NNI apparatus 24 and the UNI apparatus 25, can be regarded as a same cell bridge apparatus except for presence or absence of the selector 10 for switching. Therefore, the NNI apparatus 24 for the intra-port multicast is described below. It is to be noted that cell data handled in the NNI apparatus 24 are data of a combination of an internal identifier and a payload of an ATM cell.

Referring to FIG. 2, the NNI apparatus 24 shown includes a buffer unit 1, a buffer controller (buffer control unit) 2, a cell production control unit 3, and an outputting unit 9.

The buffer unit 1 stores cell data inputted thereto, and the buffer controller 2 controls writing and reading out of such cell data into and from the buffer unit 1.

The cell production control unit 3 manages multicast information of cell data read out from the buffer unit 1 by the buffer controller 2 and produces a cell to be outputted from header information of the cell data.

The outputting unit 9 outputs a cell produced by the cell production control unit 3 and issues a data readout request to the buffer controller 2.

In the following, the buffer unit 1, buffer controller 2, cell production control unit 3 and outputting unit 9 are described in detail.

Figure 4:
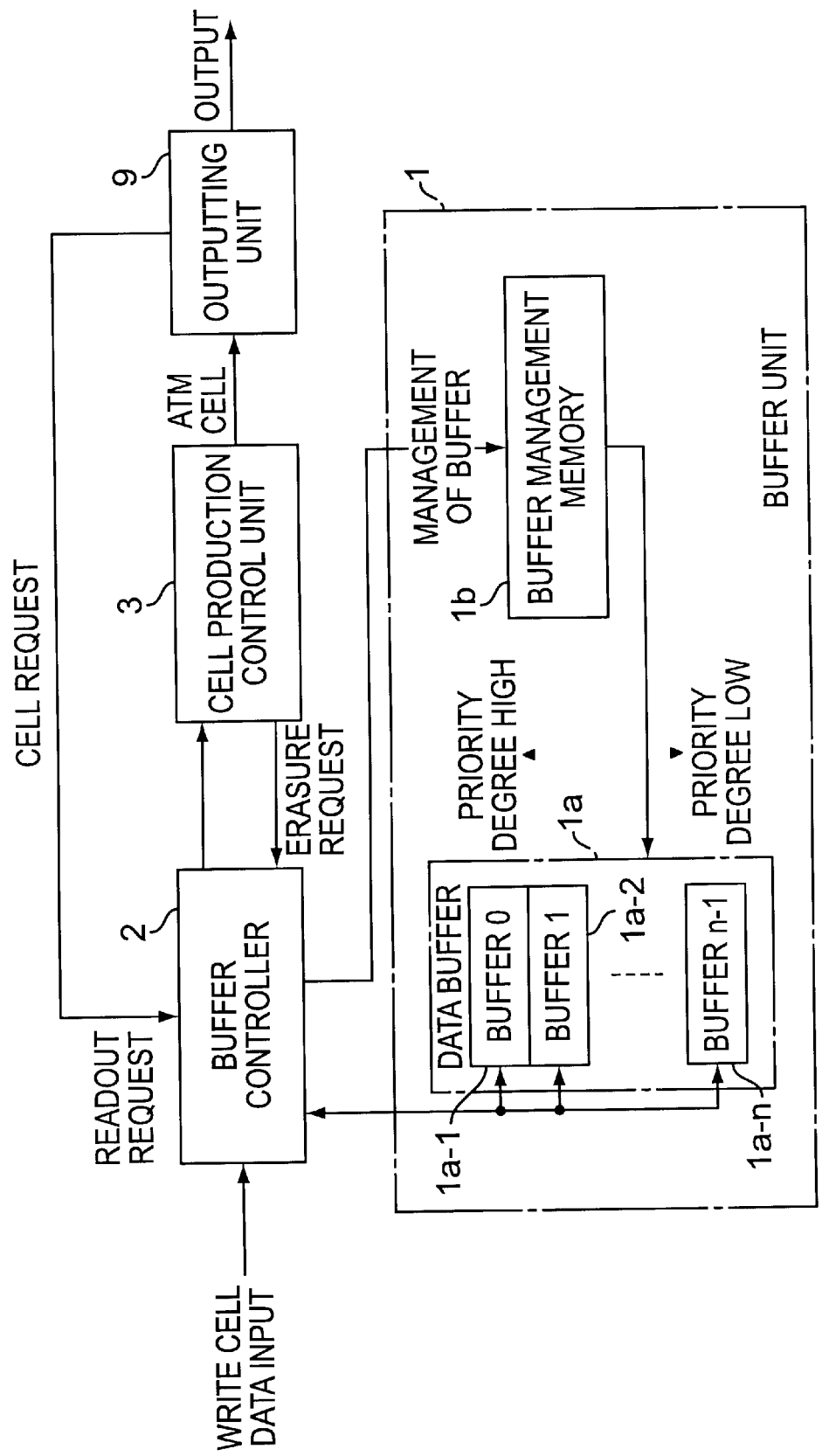
FIG. 4 is a block diagram showing a buffer unit, a buffer controller and an outputting unit of the NNI apparatus.

FIG. 4 shows a construction of the buffer unit 1, buffer controller 2 and outputting unit 9 of the NNI apparatus. Referring to FIG. 4, the buffer unit 1 shown stores inputted cell data in accordance with priority degrees of the input cells and includes a data buffer 1a having a plurality of buffers 1a-1 to 1a-n provided separately for different priority degrees of input cells, and a buffer management memory 1b.

The data buffer 1a reads out, when it receives a cell data readout request (cell request) from the outputting unit 9, input cell data having a high priority degree from among cell data stored in the data buffer 1a. Accordingly, if cell data having a high priority degree are inputted during cell copying upon multicasting, then the data buffer 1a stops its copying and processes the cell data preferentially.

The buffer management memory 1b has a plurality of areas prepared for the different output ports and for the different priority degrees and manages a data area into which data are to be stored. Then, if three different kinds of requests including a readout request, a write request and an erasure request are inputted to the buffer management memory 1b, then the buffer management memory 1b selects only one of the requests depending upon to which ones of the ports and to which ones of the priority degrees the requests correspond, and performs predetermined operation for the selected request.

The buffer controller 2 controls writing and reading out of cell data into and from the buffer unit 1, and reads out priority information from data of an inputted cell and controls writing/reading out of the buffer unit 1 based on the priority information.

More particularly, the buffer controller 2 shown in FIG. 4 extracts, if a cell is inputted thereto and a write request is received, priority degree of the cell data and writes the cell data into the data buffer 1a. Then, when a cell to be outputted is sent out from the outputting unit 9 and a cell request signal (readout request) is received from the outputting unit 9, the buffer controller 2 reads out the input cell data which has the highest priority degree from among cell data stored in the buffer unit 1 and outputs the read out cell data to the cell production control unit 3.

The cell production control unit 3 manages multicast information of the cell data read out from the buffer unit 1 by the buffer controller 2 and produces a cell to be outputted from the header information of the cell data. Here, to produce a cell to be outputted signifies to perform replacement processing of the header of the inputted cell data. Further, if the multicast information in the header of the input cell represents that multicast is unnecessary, then the cell production control unit 3 outputs a request to the buffer controller 2 to erase the corresponding cell data stored in the buffer unit 1 and being currently processed.

Figure 5:
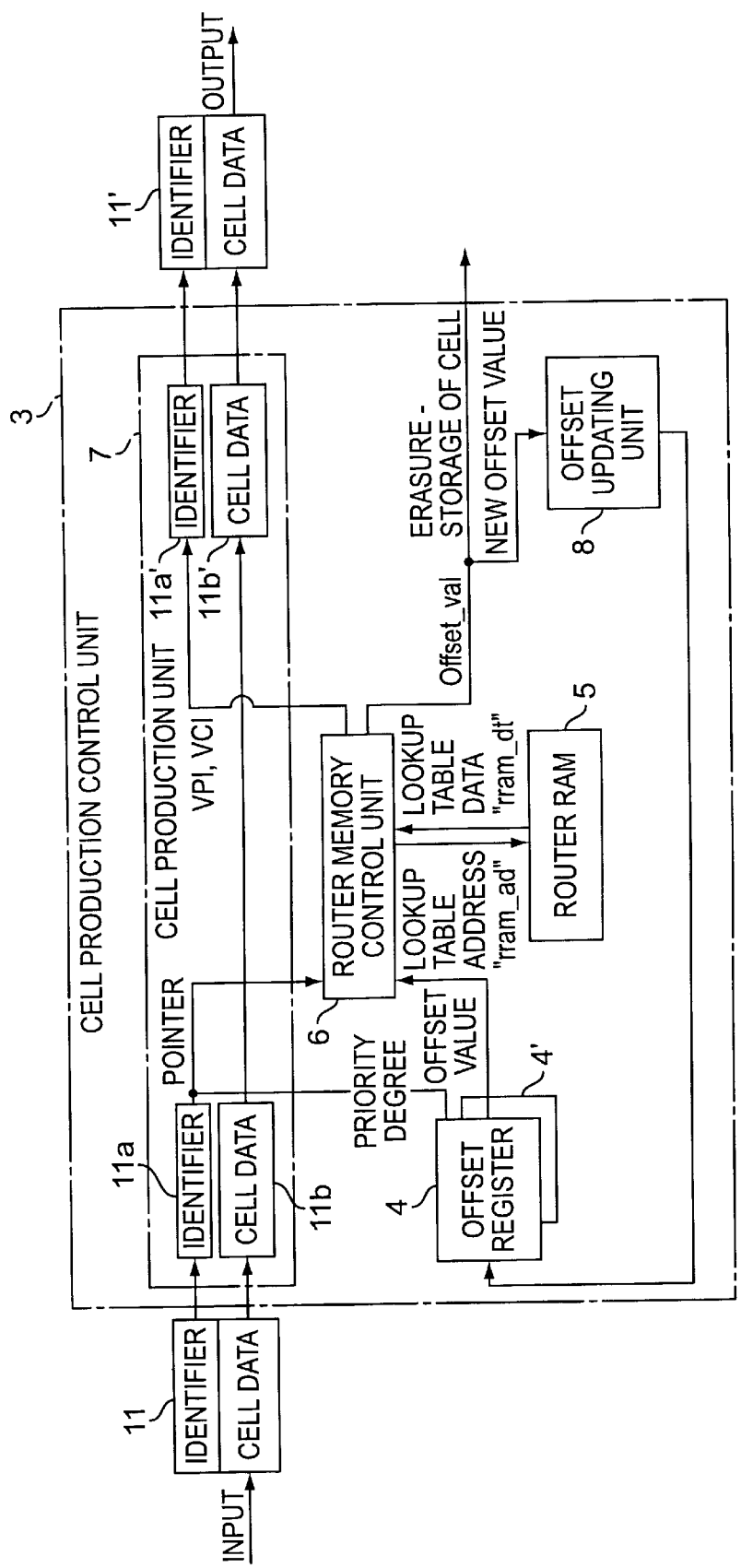
FIG. 5 is a block diagram showing a cell production control unit.

FIG. 5 shows a construction of the cell production control unit 3. Referring to FIG. 5, the cell production control unit 3 shown includes offset registers 4 and 4', a router RAM 5, a router memory control unit 6, a cell production unit 7, and an offset updating unit 8.

Each of the offset registers 4 and 4' stores an updateable offset value (Offset) in accordance with a priority degree of an input cell. A suitable plural number of such offset registers are prepared.

The router RAM 5 is a memory for storing header information for a cell to be outputted and multicast information.

The router memory control unit 6 reads out header information (VPI, VCI) and new intra-port multicast information (Offset-val) stored in the router RAM 5 using address information produced based on pointer information (Pointer) obtained from the identification information of the cell data read out from the buffer unit 1 by the buffer controller 2 and priority degree information (Pri[2:0] which will be hereinafter described) of the input cell which the cell data have. It is to be noted that, when the offset value is 0, the router memory control unit 6 produces address information using only the pointer.

Then, if the intra-port multicast information read out from the router RAM 5 by the router memory control unit 6 is the information representing that multicast is unnecessary, then the router memory control unit 6 outputs a request to the buffer controller 2 to erase the corresponding cell stored in the buffer unit 1 and being currently processed.

The cell production unit 7 produces a cell to be outputted from cell data read out from the buffer unit 1 by the buffer controller 2 and header information read out from the router RAM 5 by the router memory control unit 6.

The offset updating unit 8 adds intra-port multicast information read out from the router RAM 5 by the router memory control unit 6 to an offset value and updates the value of the offset register 4 with the value obtained by the addition.

As seen from FIG. 5, a cell 11 inputted the cell production control unit 3 is decomposed into an identifier (internal identifier) 11a and cell data 11b by the cell production unit 7. The identifier 11a is inputted to and processed by the router memory control unit 6 so that a identifier 11a' is obtained, and the new identifier 11a' is combined with the cell data 11b again to make a new cell 11', which is outputted from the cell production control unit 3.

The processing of the identifier 11a is performed in the following manner. In particular, an address is produced based on pointer information obtained from the identifier 11a and an offset value read out from the offset register 4 and outputted from the router memory control unit 6, and header information and multicast information mentioned above are read out from the router RAM 5 and are returned to the router memory control unit 6. Further, a value obtained by adding intra-port multicast information from the router RAM 5 to the offset value is written as a new value into the offset register 4 by the offset updating unit 8.

Then, routing information such as VPI, VCI and so forth from the router RAM 5 determined taking the multicast information into consideration is inputted to the cell production unit 7 again. The cell production unit 7 thus produces a new identifier 11a', combines the identifier 11a' with the cell data 11b, and delivers resulting data to the outputting unit 9.

Figure 12:
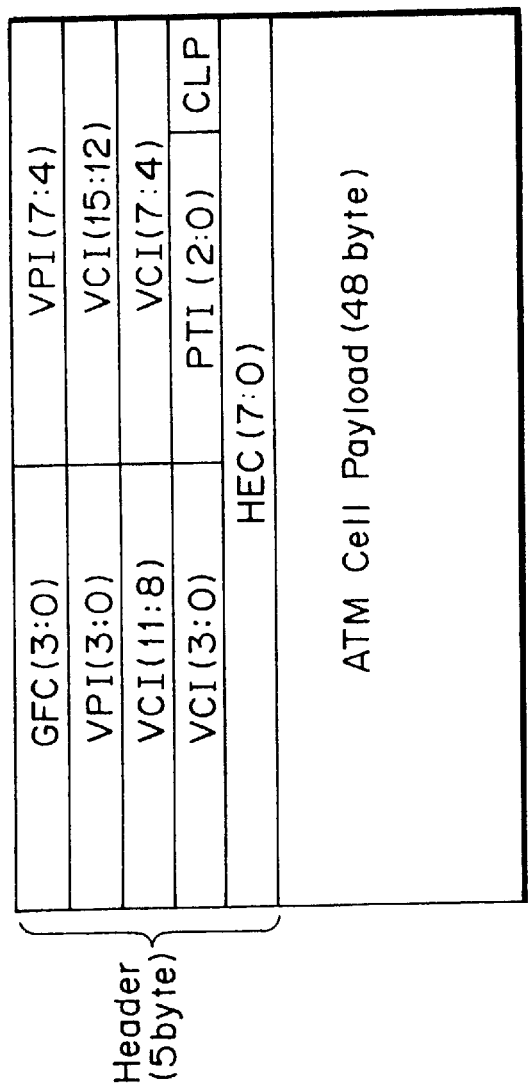
FIG. 12(a) is a diagrammatic view illustrating an known ATM cell format.
FIG. 12(b) is a diagrammatic view illustrating a header format of an input cell according to the present invention.

FIG. 12(a) illustrates a known ATM cell format of the header, and FIG. 12(b) illustrates a header format of an input cell according to the present invention. Referring to FIG. 12(b), 16 bits set by a microcomputer from among 32 bits of ConnID[15:0] and VCI[15:0] are used as a pointer. Meanwhile, the storage area for the priority degrees of the data is allocated to one byte of DP from within Pri[2:0] of H3 illustrated in FIG. 12(b), and this uses one byte from within the payload of FIG. 12(a).

The various fields of FIGS. 12(a) and 12(b) are described briefly with reference to FIG. 13.

GFC (Generic Flow Control) prescribes a function of flow control between a point and multiple points and is composed of bits to be used for flow control to distribute data from one ATM interface point to a plurality of nodes.

ConnID (Connection ID) corresponds to a VPI (Virtual Path Identifier) and is used for identification of a virtual path for routing.

VCI (Virtual Channel Identifier) is used for identification of a virtual channel for routing. PTI (Payload Type Identifier) is used for identification of operation maintenance information and for user cell congestion control.

CLP (Congestion Loss Priority) represents a grade of a cell in order to preferentially abandon a less important cell and relieve an important cell.

Pri (Priority of Cell) and Imp (Importance of Cell) represent a priority degree of the cell according to the present invention and is placed in one byte of the top of the payload region. Owing to the two fields just mentioned, cell priority information having different significance from PTI and CLP included in the header part can be placed. In particular, PTI and CLP are used to discriminate whether or not the cell should be abandoned when congestion occurs in the network, but Pri and Imp according to the present invention are used for identification of the priority degree of the data. Here, the system control signal is data having a high priority degree, and audio degree have a higher priority degree than video data.

Res represents a reserved field, and HP and DP are fields for parities.

Processing operation for the data buffer 1a when the buffer controller 2 receives a readout request, an erasure request and a write request is illustrated in FIGS. 6(a) to 6(d).

Figure 6:
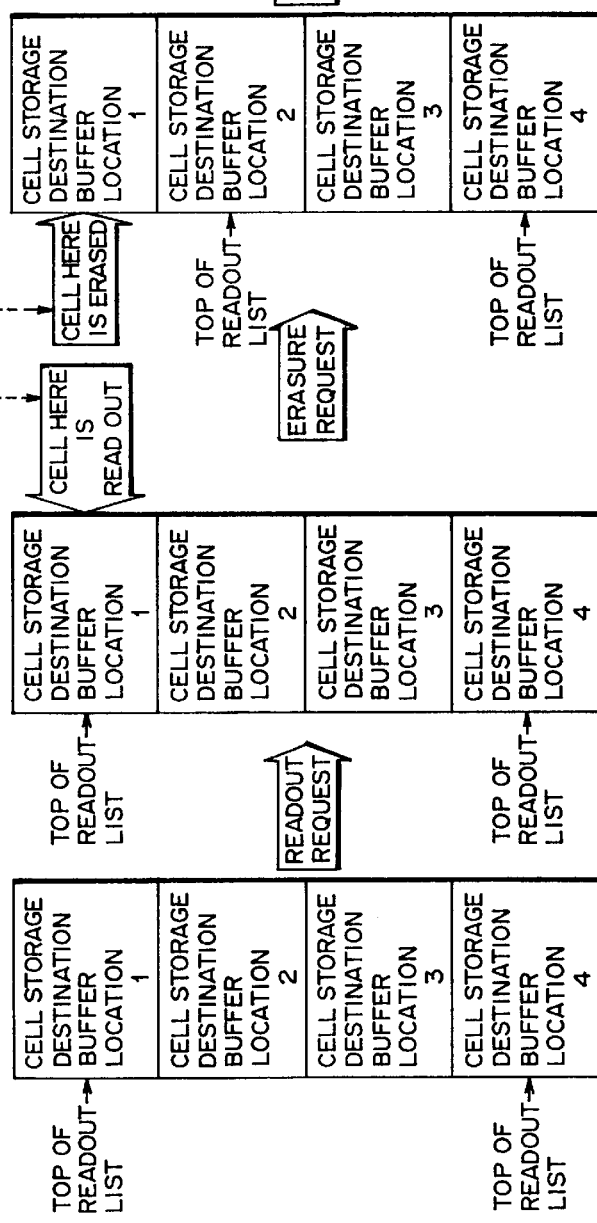
FIG. 6(a) is a diagrammatic view illustrating a construction of a data buffer.
FIG. 6(b) is a similar view but illustrating processing operation to the data buffer when a readout request is transmitted to the buffer controller.
FIG. 6(c) is a similar view but illustrating processing operation to the data buffer when an erasure request is transmitted to the buffer controller.
FIG. 6(d) is a similar view but illustrating processing operation to the data buffer when a write request is transmitted to the buffer controller.

The data buffer 1a in such a state as illustrated in FIG. 6(a) receives a cell request signal (readout request) issued from the outputting unit 9, refers to the buffer management memory 1b as seen in FIG. 6(b) to receive information of at which location of the buffer the cell at the top of a readout list is, and reads out the cell from the data buffer 1a.

If the data buffer 1a in such a state as illustrated in FIG. 6(a) receives an erasure request outputted from the cell production control unit 3, then it refers to the buffer management memory 1b as seen in FIG. 6(c) and erases a cell at the top of the readout list from the data buffer 1a to update the readout list.

On the other hand, if the data buffer 1a in such a state as illustrated in FIG. 6(a) receives a write request which is issued when a cell is inputted, then it writes the cell into a free area of the data buffer 1a and records, to the last of the readout list of the buffer management memory 1b, information of to which location of the data buffer 1a the cell is written.

Here, operation for cell copying processing which is performed by the cell production control unit 3 is described with reference to FIGS. 7 to 9.

Figure 7:
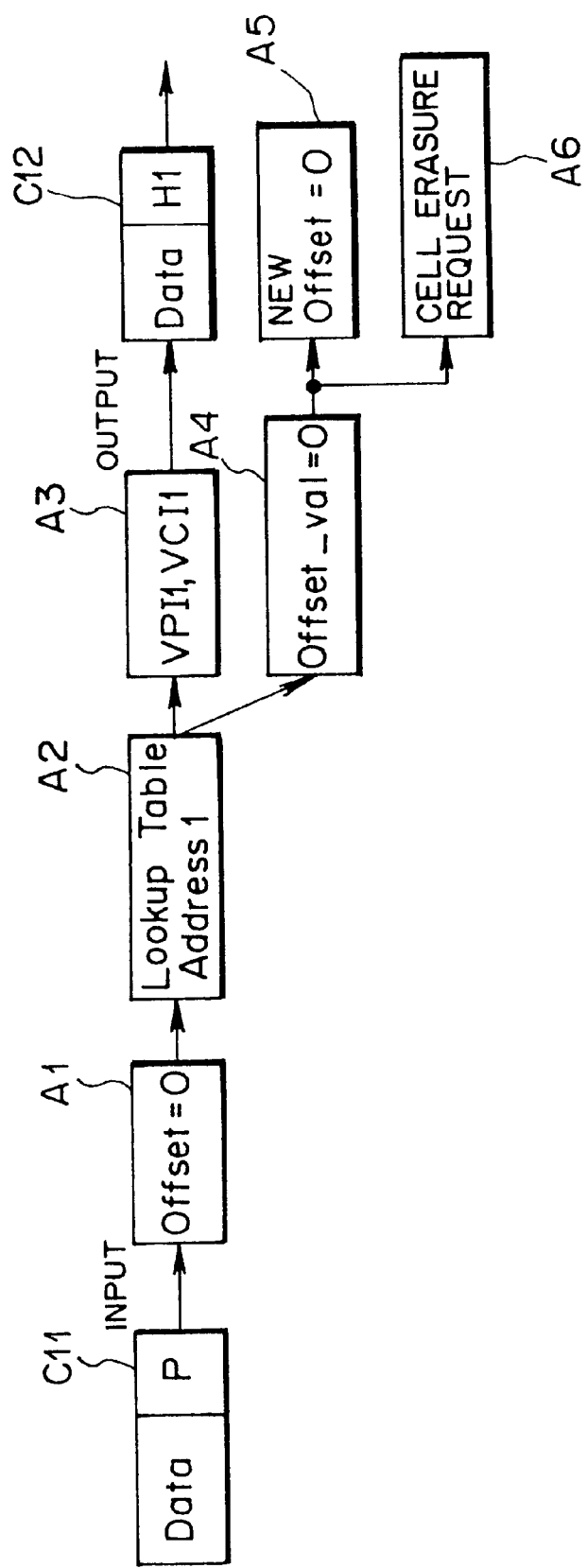
FIG. 7 is a flow diagram illustrating processing for an ordinary cell according to the present invention.

First, hitherto popular copying processing to produce one copy is illustrated in a flow diagram shown in FIG. 7. Referring to FIG. 7, if a cell C11 is first inputted as seen in FIG. 7, then the offset value (Offset) is reset to 0 (step A1) and the address of the router RAM 5 is searched for (step A2). Consequently, the header information VPI and VCI (step A3) and the Offset-val value of 0 which is a copy counter of the intra-port multicast number (step A4) are obtained, and a resulting new cell C12 is outputted. Here, since the Offset-val value is 0, such copying operation is ended after it is performed only once, and the offset register value is updated to 0 (step A5). Further, an erasure request for the cell is outputted from the cell production unit 7 to the buffer controller 2 (step A6).

Figure 8:
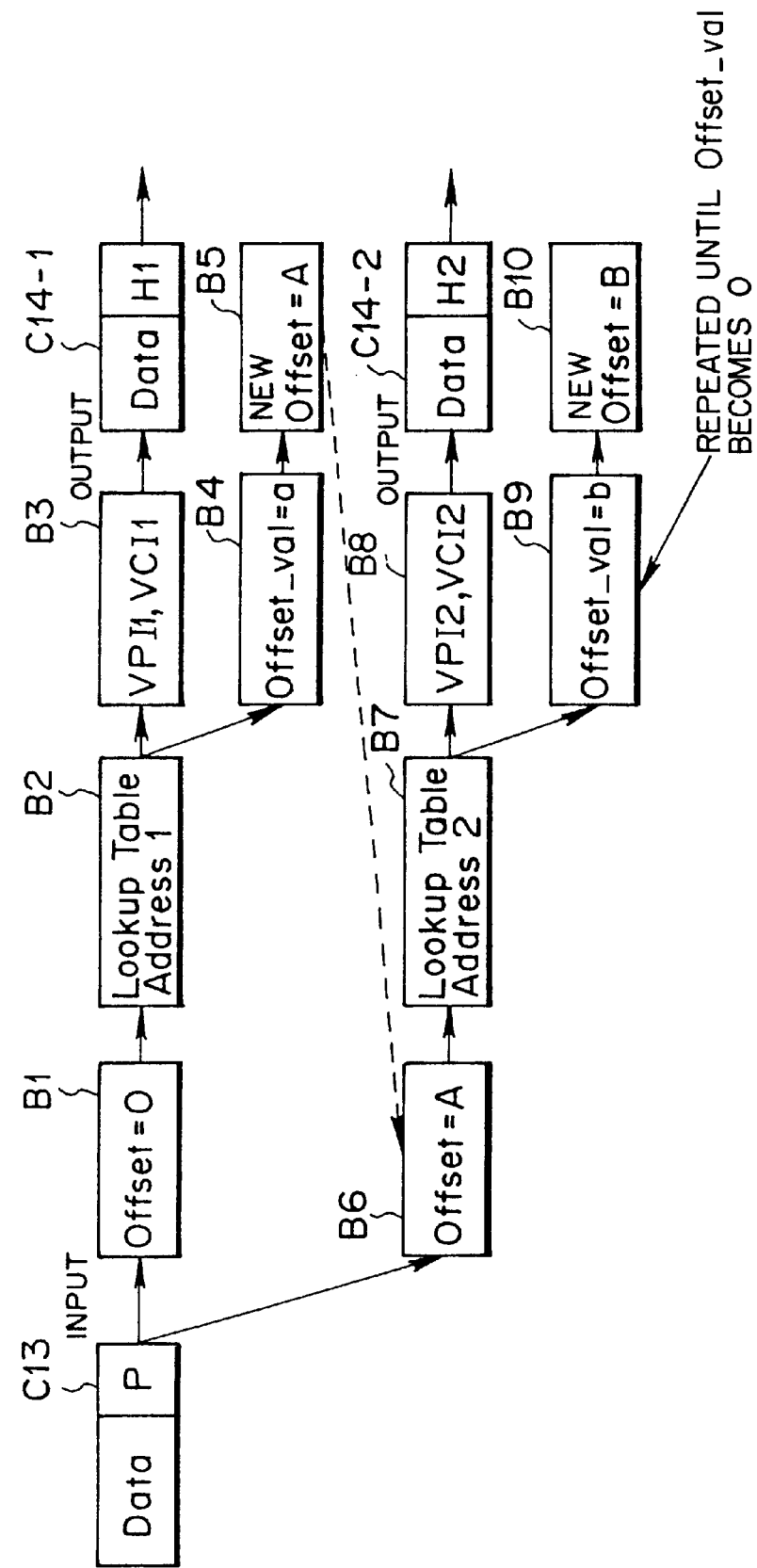
FIG. 8 is a flow diagram illustrating production of intra-port multicast cells.

On the other hand, copying processing to produce a plurality of copies is illustrated in a flow diagram of FIG. 8. Referring to FIG. 8, if a cell C13 illustrated is inputted, then the offset value is reset to 0 (step B1). Then, the address of the router RAM 5 is searched for (step B2), and the header information VPI and VCI is obtained (step B3) and "a" is placed into the Offset-val value which is a copy counter of the intra-port multicast number (step B4). Then, a resulting new cell C14-1 is outputted. Here, "A" is set as the new offset value (step B5). Since the Offset-val value does not become equal to zero as a result of the single copying operation, the same sell data are processed by a required number of times in response to successive requests from the outputting unit 9. For example, in the second copying processing, another address of the router RAM 5 which is different by the Offset-val value "a" from the precedently searched address is searched for (steps B6 to B7) and header information (step B8) and an Offset-val value (step B9) are obtained similarly, and "B" is set as the new offset value (step B10) and a new cell C14-2 to which a header different from that to the cell C14-1 is added is outputted. Thereafter, the loop of operations is repeated until the Offset-val value becomes equal to zero.

Here, since the address of the router RAM 5 exhibits a different value every time in accordance with the offset value, cells having different VPIs and VCIs can be outputted.

Subsequently, a flow of processing when a cell having a higher priority degree is inputted while an intra-port multicast cell is being processed is described.

Figure 9:
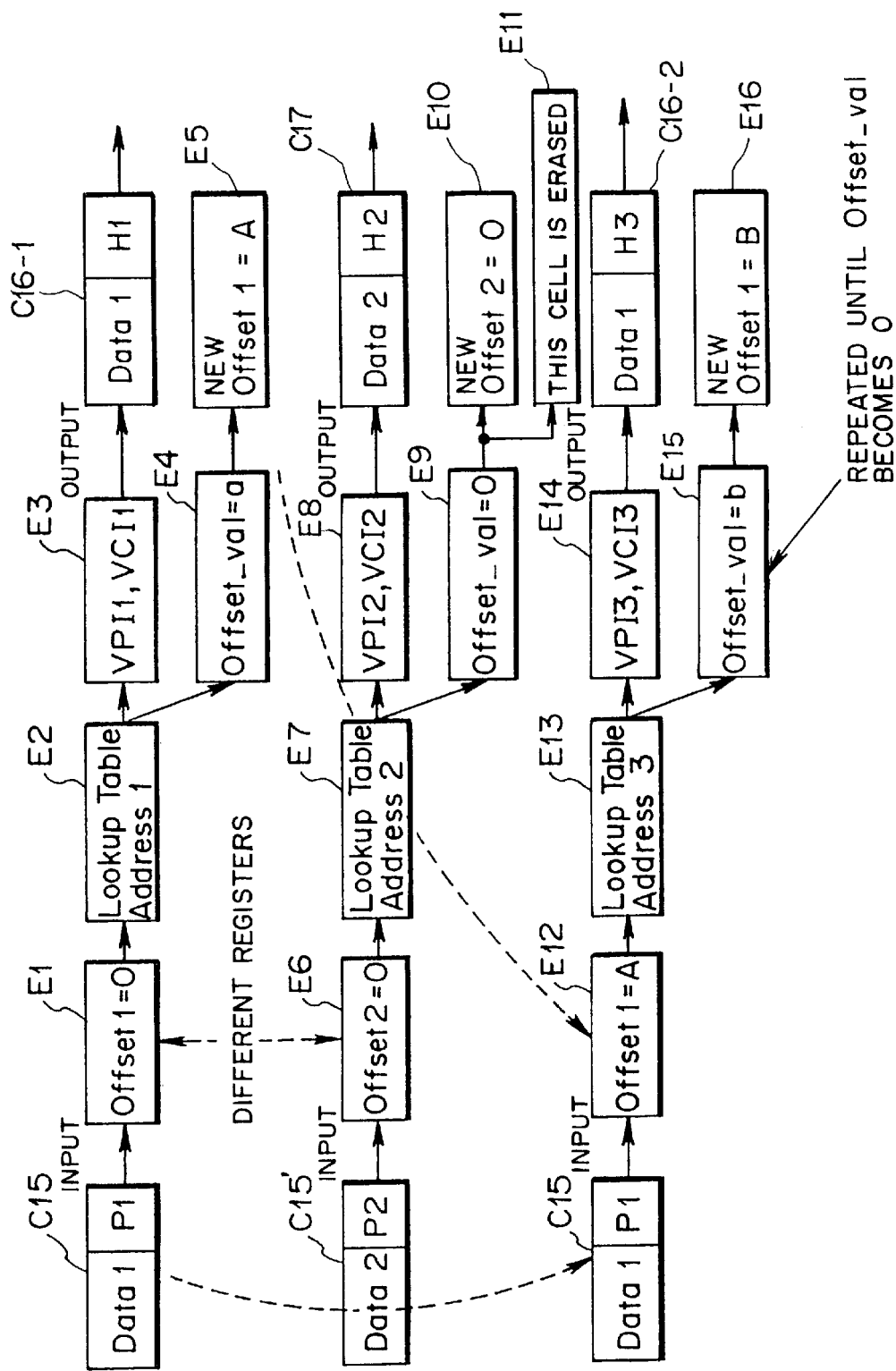
FIG. 9 is a flow diagram illustrating processing when a cell of a higher priority degree is inputted during copying of a cell to produce a plurality of copied cells.

FIG. 9 illustrates a flow of processing when a cell having a higher priority degree is inputted during copying of a cell to produce a plurality of copies. Referring to FIG. 9, a cell C15 has a priority degree P1, and when the cell C15 is inputted, the offset value of the offset register 4 is reset to zero (step E1). Then, such processing as described above is performed to set "A" as the offset value (steps E1 to E5) and output a new cell C16-1.

At this point of time, if another cell C15' having a higher priority degree P2 than that of the cell C15 is inputted, then the different offset register 4' is prepared as Offset 2 and reset to zero (step E6). Then, header processing for the new cell of a higher priority degree is performed (steps E7 to E8), and a resulting new cell C17 is outputted. Then, the Offset-val value which is a copy counter of the intra-port multicast number is changed to zero (step E9), and the offset value is set to zero (step E10) and the cell data are erased (step E11). The copying of the cell C15' is ended after it is performed only once in this manner.

Then, the control returns to the copying processing for the cell C15, and the offset value is re-set to A in order to continue the copying of the cell C15 (step E12). Then, the processing described above is performed (steps E13 to E15), and a second cell C16-2 is outputted. Further, the offset value is set to B (step E16). Such a sequence of operations as described above is repeated until the Offset-val value becomes equal to zero.

Since the information of the intra-port multicast is managed not with an offset value which has been used usually but by offset registers prepared for different priority degrees in this manner, if an intra-port multicast cell is inputted again after a cell having a higher priority degree is processed, then the processing is resumed from the interrupted portion.

Figure 10:
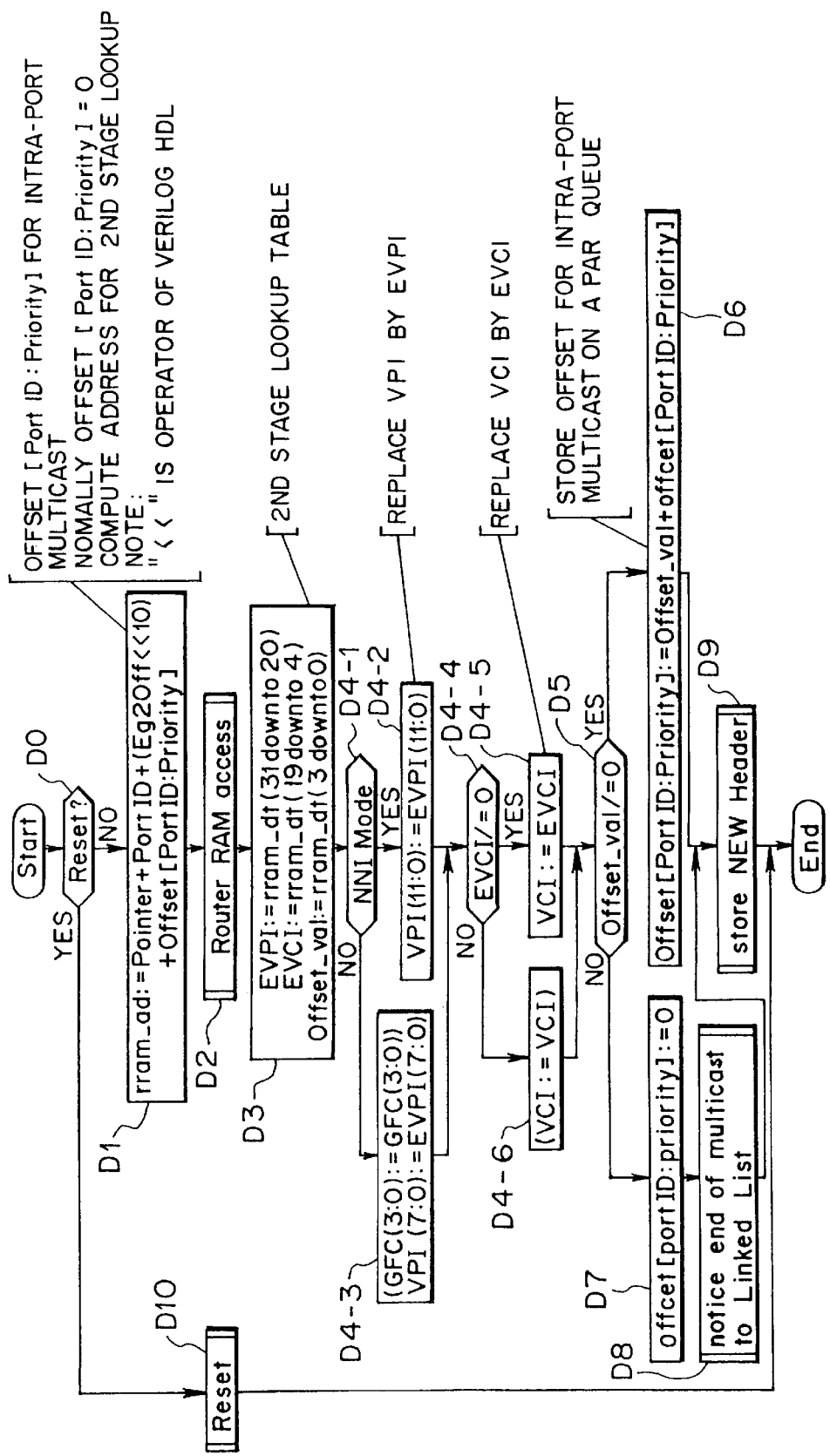
FIG. 10 is a flow chart illustrating operation of the cell production control unit.

FIG. 10 illustrates a detailed operation flow of the cell production control unit 3 described above, and replacement of a header is performed in the following manner. In particular, it is first discriminated whether or not resetting should be performed (step D0), and if resetting should not be performed, then the cell production control unit 3 receives an offset value from the offset register 4 based on the priority degree of the received cell data and stores information of the intra-port multicast for the priority degree of the cell. In this state, the cell production control unit 3 produces an address rram-ad from a pointer extracted from the identifier 11a of the cell data illustrated in FIG. 5 and the offset value (step D1), and searches the table of the router RAM 5 (step D2). It is to be noted that, if the offset value is 0, then only the pointer is used to produce the address rram-ad.

The cell production control unit 3 updates the header information EVPI and EVCI and the intra-port multicast information Offset-val based on the data rram-dt of 32 bits from the router RAM 5 (step D3). Then, the cell production control unit 3 produces the header VPI and VCI of the ATM cell based on the header information EVPI and EVCI (steps D4-1 to D4-6).

Then, the cell production control unit 3 discriminates whether or not the Offset-val value is equal to zero (step D5). If the Offset-val value is 0, then the cell production control unit 3 resets the offcet to zero (step D7) and issues a notice of ending of the multicast (step D8), whereafter it produces a new header (step D9). Thereupon, the new ATM cell header 11a' is delivered to the outputting unit 9. Further, in this instance, a cell erasure request is outputted to the buffer controller 2.

On the other hand, if the Offset-val value is not equal to zero in step D5, then the cell production control unit 3 places a sum of the Offset-val value and the offcet into the offset register 4 (step D6) and produces a new header (step D9). Further, in this instance, the cell production control unit 3 outputs a cell storage request to the buffer controller 2.

It is to be noted that, if a reset signal is received in step D0, then resetting processing is performed in step D10, and the present flow is ended without performing such processing as described above.

The bridging function of the cell production control unit 3 is realized by the processing described above with reference to FIGS. 7 to 9 in this manner. In summary, the cell production control unit 3 performs such bridging of an ATM cell as illustrated in FIG. 7 and such intra-port multicast by copying a cell to produce a plurality of copies as illustrated in FIG. 8, and further performs, when a cell of a higher priority degree is inputted, such intra-port multicast wherein the cell is bridged preferentially and then interrupted copying of a former cell is resumed from an interrupted portion of the same as illustrated in FIG. 9.

Figure 11:
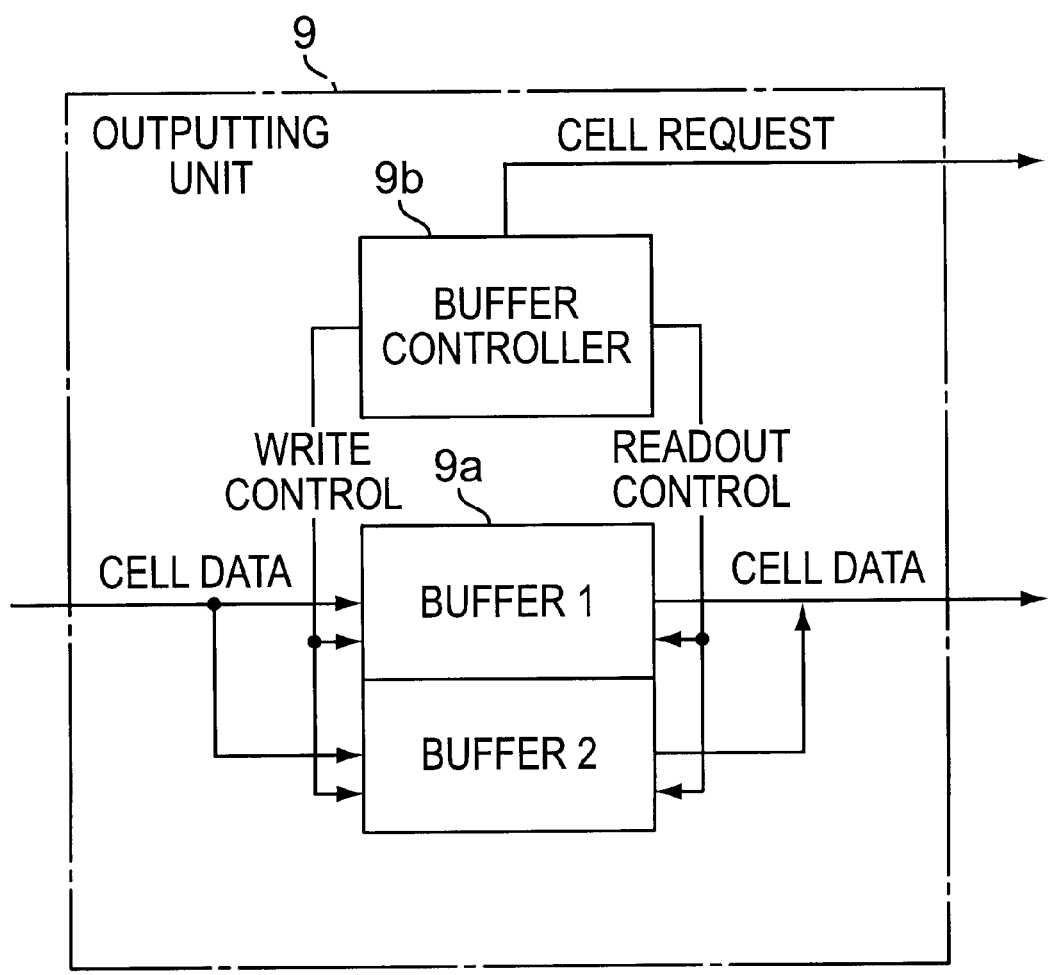
FIG. 11 is a block diagram showing a construction of the outputting unit.

FIG. 11 shows a construction of the outputting unit 9. Referring to FIG. 11, the outputting unit 9 outputs a cell produced by the cell production control unit 3 to the ATM network 23 and issues a cell data readout request to the buffer controller 2. In particular, the outputting unit 9 outputs data of a cell whose header has been processed by the cell production control unit 3 and returns, each time it outputs one such cell data, a cell request signal to the buffer controller 2 so that the buffer controller 2 can confirm whether or not there is data of a cell having a high priority degree. To this end, the outputting unit 9 includes a buffer 9a having storage areas for a plurality of cells to be outputted and a buffer controller 9b for performing write/read control of the buffer 9a in order to minimize the interval between cells to be outputted.

Thus, each time cell data for which header replacement processing has been performed by the cell production control unit 3 is read out and sent out to the buffer 9a, the buffer 9a issues a cell request signal to the buffer controller 2. When the request signal is received, the buffer controller 2 reads out cell data having the highest priority degree from the buffers 1a-1 to 1a-n at this point of time and outputs the cell data to the cell production control unit 3.

In this manner, the NNI apparatus 24 (22) includes the buffer unit 1, buffer controller (buffer control unit) 2, cell production control unit 3, and outputting unit 9, and since the cell production control unit 3 bridges, when a cell having a higher priority degree is inputted thereto, the cell preferentially and resumes cell copying from an interrupted portion of the same to perform intra-port multicast, the burden to the transmission source is moderated by the intra-port multicast on the ATM transmission apparatus. Further, since cells are transmitted in accordance with priority degrees thereof, there is an advantage that the transmission efficiency of cells having high priority degrees can be raised.

Similarly, the UNI apparatus 25 includes the buffer unit 1, buffer controller (buffer control unit) 2, cell production control unit 3, outputting unit 9 and selector 10, and the cell production control unit 3 bridges, when a cell having a higher priority degree is inputted thereto, the cell preferentially and resumes cell copying from an interrupted portion of the same to perform multicast. Further, a switching function is additionally provided by the selector 10. Consequently, the UNI apparatus 25 can perform multicasting to a plurality of nodes on the ATM network 23.

Since such cell bridge apparatus 24 and 25 are provided, the ATM information transmission system 20 can perform information transmission of multimedia or the like.

In particular, the ATM information transmission system 20 includes the center 21 for storing information, the plurality of subscriber terminals 26-1 to 26-n which utilize the information from the center 21, and the cell bridge apparatus 25 for performing multicast processing for the information transmitted thereto from the center 21 over the ATM network 23, which handles fixed length cells, to transmit the information to the plurality of subscriber terminals 26-1 to 26-n, and the cell bridge apparatus 25 includes the buffer unit 1 for storing cell data of input cells, the buffer controller 2 for controlling writing and reading out of the cell data into and from the buffer unit 1, the cell production control unit 3 for managing multicast information of the cell data read out from the buffer unit 1 by the buffer controller 2 and producing a cell to be outputted from header information of the cell data, and the cell outputting unit 9 for outputting the cell produced by the cell production control unit 3 and issuing a cell data readout request to the buffer controller 2, the buffer unit 1 storing the cell data in accordance with priority degrees of the input cells, the buffer controller 2 being constructed in such a manner as to read out, when the cell data readout request from the cell outputting unit 9 is received, the input cell data of a high priority degree from among the cell data stored in the buffer unit 1.

Then, the center 21 in which multimedia information of movies and so forth is stored distributes, in response to a plurality of requests for the same work from the subscriber terminals 26-i (i=1 to n), only one video data to the ATM network 23, which handles ATM cells, and the NNI apparatus 24 copies the data cell to produce a number of copies equal to the number of the requests to perform intra-port multicast whereas the UNI apparatus 25 copies the data cell to produce a number of copies equal to the number of the requests and distributes the copied data to the individual subscriber terminals 26-i (i=1 to n). In this instance, as described hereinabove, the cell production control unit 3 performs bridging of the ATM cell as seen from FIG. 7, or performs copying of the ATM cell to produce a plurality of copied cells as seen in FIG. 8 to perform intra-port multicast. Further, if a cell having a higher priority degree is inputted, then the cell production control unit 3 bridges the cell preferentially and resumes the original cell copying from an interrupted portion of the same to perform intra-port multicast. Consequently, the following can be said.

Figure 14:
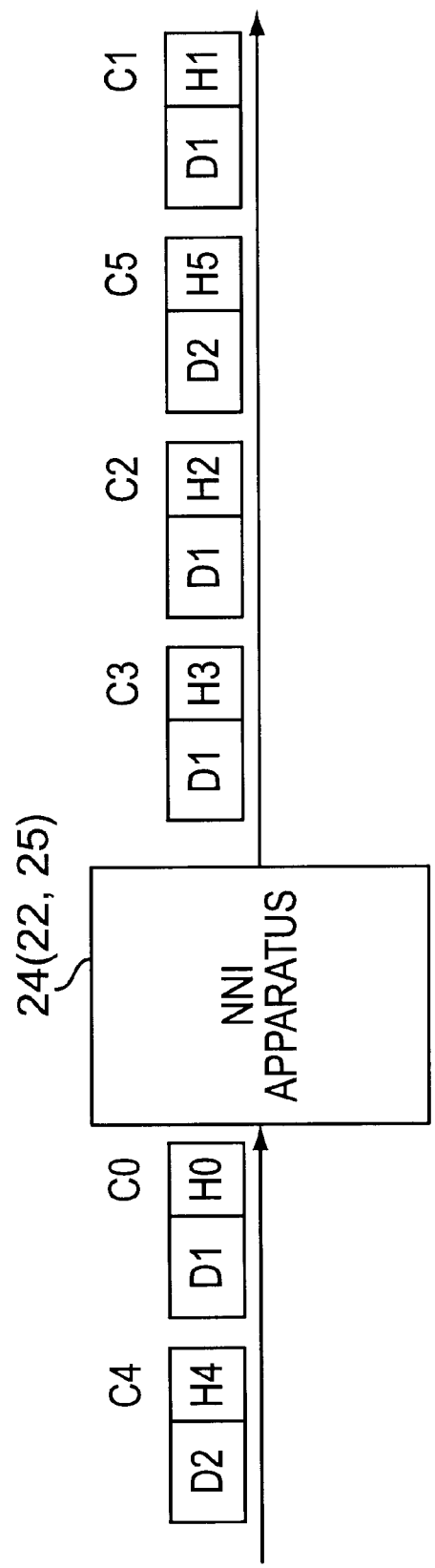
FIG. 14 is a diagrammatic view illustrating cell copying by the cell bridge apparatus of the present invention.
Figure 15:
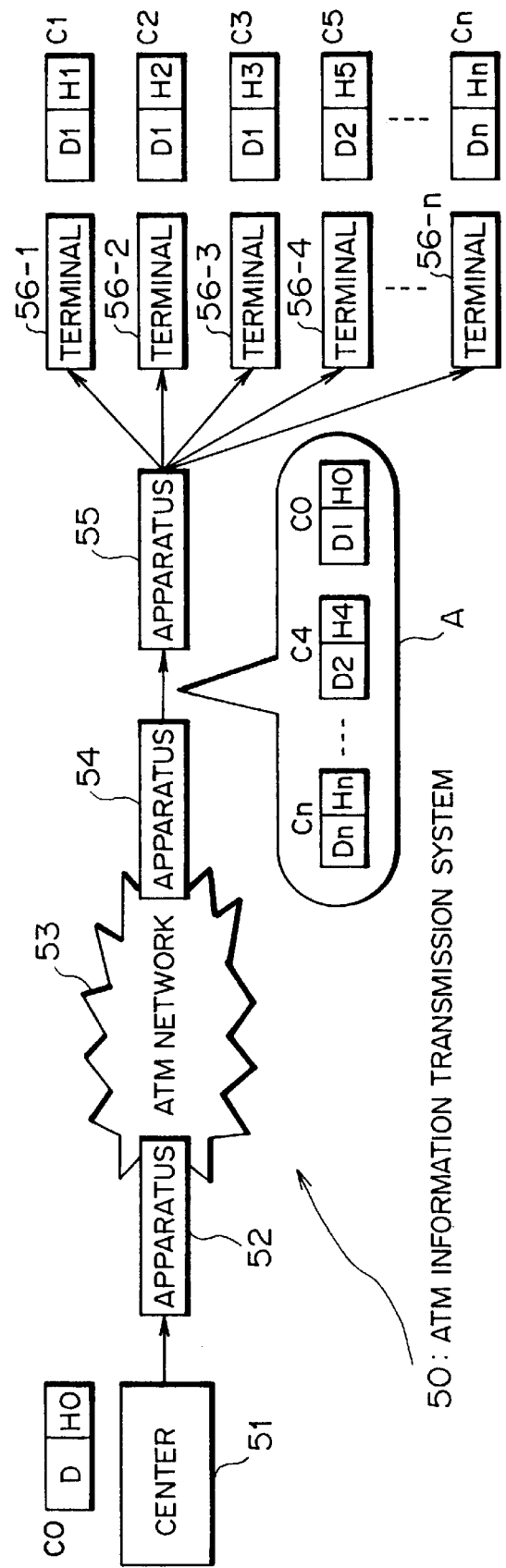
FIG. 15 is a block diagram illustrating a concept of an integrated video service.
Figure 17:
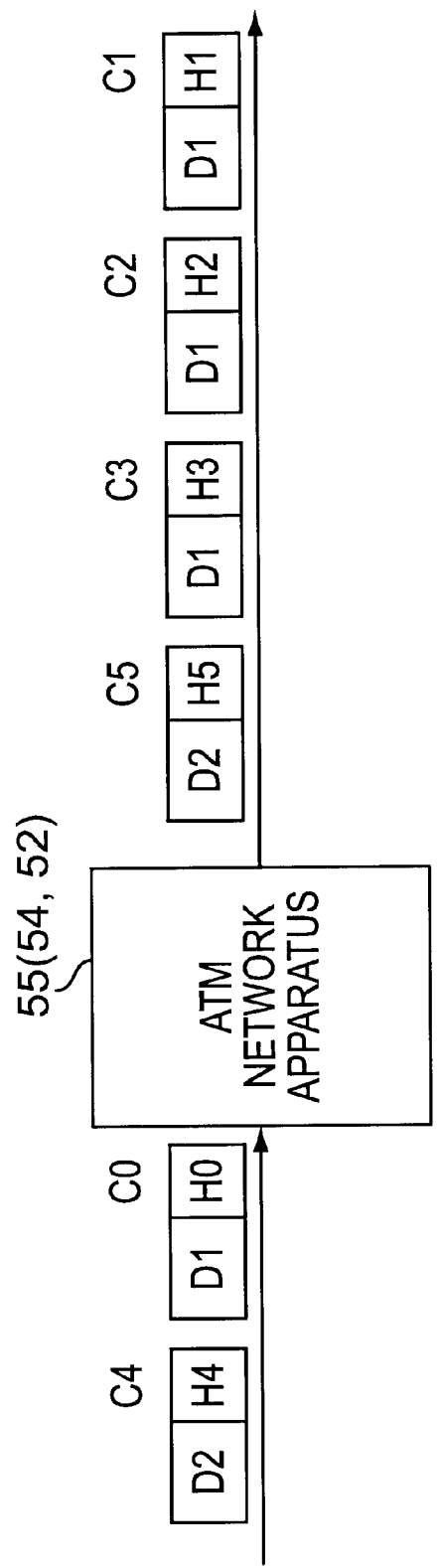
FIG. 17 is a diagrammatic view illustrating cell copying by a cell bridge apparatus.

In particular, in addition to the advantage that the traffic of the ATM network 23 can be reduced, if a cell having a higher priority degree is inputted, the cell can be bridged preferentially. Consequently, the transmission efficiency of cells having high priority degrees can be raised. Further, when multicast cells are outputted, multicast information is managed using the offset register 4 in the cell production control unit 3. By performing the two processes independently of each other, it is possible to process and output cells in accordance with the priority degrees of them while performing intra-port multicast like the NNI apparatus 24 shown in FIG. 14.

Further, when notice is taken of a flow of processing, the following can be said. In particular, since a step of storing cell data of input cells into the buffer unit 1 in accordance with priority degrees of the input cells, a step of reading out, when the buffer controller 2 receives a cell data readout request from the outputting unit 9, the input cell data of a high priority degree from among the cell data stored in the buffer unit 1 by the buffer controller 2, a step of performing management of multicast information of the cell data read out from the buffer unit 1 by the buffer controller 2 in accordance with the priority degrees of the cell data and producing a cell to be outputted from header information of the cell data by the cell production control unit 3, a step of outputting the cell produced by the cell production control unit 3 from the outputting unit 9, and a step of issuing, after the cell is outputted from the outputting unit 9, the cell request signal to the buffer controller 2 from the outputting unit 2 are executed, a cell having a high priority degree can normally be read out from the buffer unit 1.

Due to the construction described above, the disadvantage that processing of a cell having a higher priority degree cannot be performed during copying can be eliminated. In particular, not the method of performing, if a cell having a higher priority degree is present in the buffer at a point of time when copying of a cell to produce a plurality of copied cells is completed and next processing is enabled, processing of the cell of a higher priority degree is performed, but each time a cell is outputted, processing of a high priority degree can be performed. Further, due to the construction, the burden to the transmission source is reduced by intra-port multicast on the ATM transmission apparatus. Further, since cells are transmitted in accordance with priority degrees of them, the transmission efficiency of cells having high priority degrees can be raised.

It is to be noted that the present invention is not limited to the embodiment described above. For example, as the memory construction of the buffer unit 1, a plurality of hardware units need not be prepared, but the area of a single hardware unit may be divided into a plurality of areas.

Further, the present invention can be applied also to transmission protocols other than the ATM protocol. In particular, the present invention can be embodied in various forms without departing from the spirit and the scope thereof in a protocol wherein a transmission form is composed of data and a header.

What is claimed is:

1. A cell bridge apparatus, comprising:
    a buffer unit for storing cell data of input cells, said input cells having a header region including multicast information and information related to a grade of a cell and a payload region used for identification of a priority degree of said cell data;
    a buffer control unit for controlling writing and reading out of the cell data into and from said buffer unit;
    a cell production control unit for producing a cell to be outputted from header information of the cell data read out from said buffer unit by said buffer control unit preferentially to process one or more cells upon multicasting or to process the cell data having a high priority degree; and
    a cell outputting unit for outputting the cell produced by said cell production control unit and issuing a cell data readout request to said buffer control unit;
    said buffer unit storing the cell data in accordance with priority degrees of the input cells;
    said buffer control unit being constructed in such a manner as to read out, when the cell data readout request from said cell outputting unit is received, the input cell data of a high priority degree from among the cell data stored in said buffer unit, as well as preferentially to control the copying of one or more cells upon multicasting.

2. A cell bridge apparatus as claimed in claim 1, wherein said buffer unit includes a plurality of buffers provided individually for the different priority degrees of the input cells.

3. A cell bridge apparatus as claimed in claim 1, wherein said buffer control unit reads out, when a readout request from said cell outputting unit is received, one of the input cell data stored in said buffer unit which has the highest priority degree.

4. A cell bridge apparatus, comprising:
    a buffer unit for storing cell data of input cells;
    a buffer control unit for controlling writing and reading out of the cell data into and from said buffer unit;
    a cell production control unit for managing multicast information of the cell data read out from said buffer unit by said buffer control unit and producing a cell to be outputted from header information of the cell data; and
    a cell outputting unit for outputting the cell produced by said cell production control unit and issuing a cell data readout request to said buffer control unit;
    said buffer unit storing the cell data in accordance with priority degrees of the input cells;
    said buffer control unit being constructed in such a manner as to read out, when the cell data readout request from said cell outputting unit is received, the input cell data of a high priority degree from among the cell data stored in said buffer unit; and
    said cell production control unit includes:
        a register for storing an updateable offset value in accordance with a priority degree of the input cell;
        a router memory for storing header information and multicast information for the cell to be outputted;
        a router memory control unit for reading out the header information and the multicast information stored in said router memory using address information which is produced based on pointer information obtained from identification information of the cell data read out from said buffer unit by said buffer control unit and the offset value read out from said register based on priority degree information of the input cell which the cell data have;

a cell production unit for producing the cell to be outputted from the cell data read out from said buffer unit by said buffer control unit and the header information read out from said router memory by said router memory control unit; and an offset updating unit for updating the offset value stored in said register taking the multicast information read out from said router memory by said router memory control unit into consideration.

5. A cell bridge apparatus of claim 4, wherein said cell production control unit outputs, when the multicast information read out from said router memory by said router memory control unit is information representing that multicast is unnecessary, a request to said buffer control unit to erase the corresponding cell data, which are being currently processed, stored in said buffer unit.

6. A cell bridging method for a cell bridge apparatus which includes a buffer unit for storing cell data of input cells, said input cells having a header region including multicast information and information related to a grade of a cell and a payload region used for identification of a priority degree of said cell data, a buffer control unit for controlling writing and reading out of the cell data into and from said buffer unit, a cell production control unit for producing a cell to be outputted from the cell data read out from said buffer unit by said buffer control unit preferentially to copy one or more cells upon multicasting or to process the cell data having a high priority degrees, and a cell outputting unit for outputting the cell produced by said cell production control unit, comprising the steps of:

storing the cell data of the input cells into said buffer unit in accordance with priority degrees of the input cells;

reading out, when said buffer control unit receives a cell data readout request from said cell outputting unit, the input cell data of a high priority degree from among the cell data stored in said buffer unit, as well as preferentially to copy one or more cells upon multicasting by said buffer control unit;

performing management of multicast information of the cell data read out from said buffer unit by said buffer control unit in accordance with the priority degrees of the cell data and producing a cell to be outputted from header information of the cell data by said cell production control unit;

outputting the cell produced by said cell production control unit from said cell outputting unit; and issuing, after the cell is outputted from said cell outputting unit, the cell data readout request to said buffer control unit from said cell outputting unit.

7. A cell bridging method as claimed in claim 6, further comprising a step of reading out, when the cell data readout request is received from said cell outputting unit, by said buffer control unit, the input cell data having the highest priority degree from among the cell data stored in said buffer unit.

8. An information transmission system, comprising:

a center unit for storing information;

a plurality of terminals which utilize the information from said center unit; and a cell bridge apparatus for performing multicasting for the information transmitted over a network, which handles fixed length cells, from said center unit to transmit the information to said plurality of terminals;

said cell bridge apparatus including a buffer unit for storing cell data of input cells, said input cells having a header region including multicast information and information related to a grade of a cell and a payload region used for identification of a priority degree of said cell data, a buffer control unit for controlling writing and reading out of the cell data into and from said buffer unit, a cell production control unit for producing a cell to be outputted from header information of the cell data, read out from said buffer unit by said buffer control unit preferentially to process one or more cells upon multicasting or to process the cell data having a high priority degree; and a cell outputting unit for outputting the cell produced by said cell production control unit and issuing a cell data readout request to said buffer control unit;

said buffer unit storing the cell data in accordance with priority degrees of the input cells;

said buffer control unit being constructed in such a manner as to read out, when the cell data readout request from said cell outputting unit is received, the input cell data of a high priority degree from among the cell data stored in said buffer unit, as well as preferentially to control the copying of one or more cells upon multicasting.

* * * * *